H. DECH.
APPARATUS FOR MAKING INNER TUBES FOR TIRES.
APPLICATION FILED NOV. 20, 1916.
1,270,604.
Patented June 25, 1918.
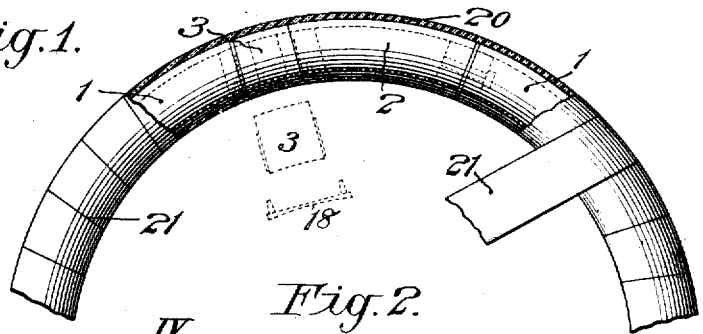
Fig. 1.
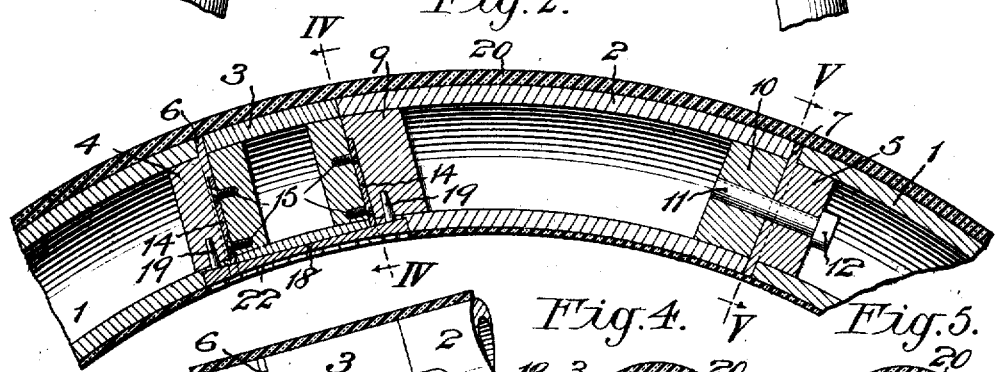
Fig. 2.
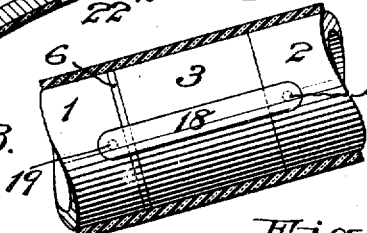
Fig. 3.
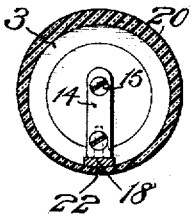
Fig. 4.
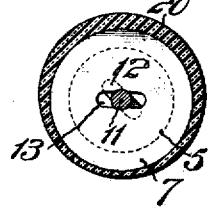
Fig. 5.
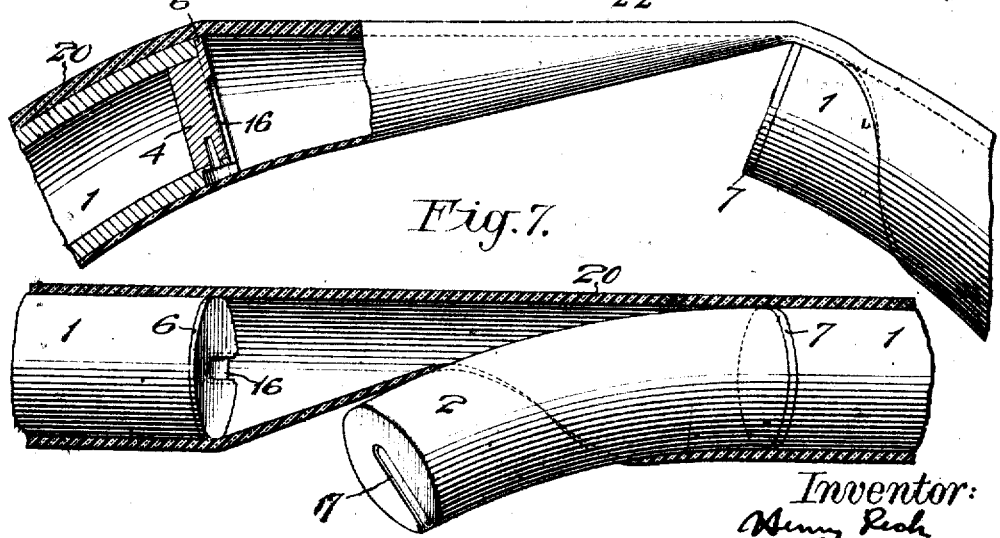
Fig. 6.
Fig. 7.
Inventor:
Henry Dech
by his attorney

UNITED STATES PATENT OFFICE.

HENRY DECH, OF TRENTON, NEW JERSEY, ASSIGNOR TO MERCER TIRE COMPANY, OF TRENTON, NEW JERSEY, A CORPORATION OF NEW JERSEY.

APPARATUS FOR MAKING INNER TUBES FOR TIRES.

1,270,604.     Specification of Letters Patent.      Patented June 25, 1918.

Application filed November 20, 1916. Serial No. 132,397.

*To all whom it may concern:*

Be it known that I, HENRY DECH, a citizen of the United States, and resident of Trenton, in the county of Mercer and State of New Jersey, have invented a new and useful Improvement in Apparatus for Making Inner Tubes for Tires, of which the following is a specification.

This invention relates to an apparatus for the manufacture of inner tubes of pneumatic vehicle tires, and more particularly to a core or mandrel for supporting the inner tube during the process of vulcanization.

The object of the invention is to provide means for the production of endless inner tubes having any desired reinforcement or thickness as to the tread portion or outer periphery thereof.

Another object consists in providing certain improvements in the form, construction and arrangement of the several parts whereby the above mentioned and other advantages inherent in the structure may be effectively attained.

Up to the present time it has been the almost invariable custom to manufacture inner tubes for pneumatic vehicle tires on either straight or spiral cores or mandrels. The straight form has been in more common use and it is referred to in the industry as a "pole". The tubes, after they have been formed on straight or spiral poles or cores, are, as is well understood, subjected to heat for the purpose of vulcanization.

These tubes are almost universally very thin and of a uniform thickness throughout. They are provided with a valve on the inner circumference. All this is well understood in the art. These inner tubes serve as airtight containers for the air which gives the tire its pneumatic character, and their rupture, either by direct puncture or abrasion, results in deflation of the tire as a whole. It has been found that one of the most frequent causes of deflation is the cracking or breaking of the fabric which constitutes the inside of the outer tire shoe or casing, which cracking or breaking raises a ridge which gradually chafes through the comparatively thin inner tube.

Furthermore, any small sharp article which penetrates the outer shoe or casing of the tire rapidly wears through the tubes in common use; and if even a very small hole is formed in the casing, the air pressure within the tire will force the wall of the inner tube therethrough and burst it.

To obviate these disadvantages it has been suggested to either reinforce the outer portion of the tube with metal, etc., or to make that portion of the tube relatively thick; but these suggestions have been found incapable of practical adoption owing to the restrictions in the known apparatus for manufacturing the same. As will be readily seen, if such a reinforced or thickened tube were made upon a straight pole, it would be very difficult to bring it into annular form, and also very difficult to telescope the free ends and cement or otherwise secure them for the purpose of rendering the tube air-tight. If such tubes are made on spiral cores or mandrels, the first objection is considerably overcome, but the latter still remains.

My invention overcome these difficulties, and enables the rapid and satisfactory manufacture of inner tubes which have their tread portions thickened or otherwise reinforced to any desired and practicably useful extent.

A practical embodiment of my invention is represented in the accompanying drawings in which, Figure 1 represents a detail side view, partly in section; certain parts being shown in removed position in dotted lines.

Fig. 2 represents an enlarged detail central section through the removable sections and adjacent parts of the core.

Fig. 3 represents a detail view, partly in section, looking at the inner periphery of one of the removable elements and adjacent parts of the core.

Fig. 4 represents a transverse section taken in the plane of the line IV—IV of Fig. 2, looking in the direction of the arrows.

Fig. 5 represents a similar view taken in the plane of the line V—V of Fig. 2, looking in the direction of the arrows.

Fig. 6 represents a detail side view, partly in section, showing one manner of removing the finished tube from the core, and Fig. 7 represents a detail edge view partly in section, showing another way of removing the finished tube from the core.

The core consists of three segments, which, when in abutting engagement, are adapted to constitute an annulus circular in cross section. These segments are denoted by 1, 2 and 3, and are preferably composed of metal, such as cast iron or steel, and hollow, with the object of lightness. The segment 1 is by far the largest and constitutes more than three-fourths of a circle. It is provided, at its extremities, with end pieces 4, 5, which have laterally enlarged outer portions 6, 7, which constitute finishing plates for the ends of the said segment 1. These plate 6, 7, may be composed of steel in order to withstand the wear of assembling and disassembling the core; and the end pieces 4, 5, may be suitably secured in position in any desired manner, as, for instance, by what is known as the sweating process.

The segment 2 is much smaller than segment 1, and it also is provided with end pieces 9, 10. For the purpose of securing the segment 2 to the segment 1, the end piece 10 is provided with a stud 11 which protrudes therefrom and has an elongated head 12 fitted to pass through a similarly shaped aperture 13 in the end piece 5, when the segment 2 is twisted out of the plane of the segment 1. After the head 12 is thus passed through the aperture 13, the segment 2 may be twisted back into the plane of the segment 1, in which position the head 12 will lie athwart the aperture 13, as clearly shown in dotted lines in Fig. 5, thereby locking the segments 1 and 2 together.

The smallest segment, denoted by 3, is formed so that its ends are substantially parallel or slightly converged outwardly to facilitate its insertion, in a radial direction, between the abutting portions of the segments 2 and 3, in order to constitute the annulus, and its withdrawal from said position for the purpose of disassociating the elements. This segment 3 has a pair of splines or keys 14, one of which is secured to each end thereof by suitable screws 15, the said splines being fitted to slide in slots or keyways 16, 17, formed in the plate 6 and end piece 9 respectively.

As an additional means of securing the segment 3 in abutting engagement with respect to the other segments, I have provided a spanner 18 which fits in a longitudinal slot or recess fashioned in the segment 3, together with slots formed in the ends of the segments 1, 2, and which register with the slot in the segment 3 when the latter is in position, as clearly shown in Figs. 2 and 3. This spanner 18 has laterally extending tapered spikes 19 which closely fit in corresponding holes in the segments 1 and 2, see Fig. 2. It will be noted that, when the spanner 18 is forced home into locking engagement with the segments 1, 2 and 3, it is flush with the surfaces thereof.

I prefer to construct the segment 1 so that it has slight tendency to contract or normally draw its extremities toward each other with the result that, after the segment 2 has been locked in position as described, the segment 3 will have to be forced outwardly in a radial direction with some degree of pressure, in order to slightly spread apart the abutting portions of the core, thus insuring a tight fit. This not only makes the joints between the several segments very fine and smooth, thereby avoiding any injurious effect upon the contiguous portion of the inner tube, but it serves to aid in holding the segment 3 in operative position with respect to the remaining parts.

In operation, the three segments are arranged in abutting engagement with each other so as to constitute an annulus, as hereinabove described; after which the inner tube, denoted by 20, is built or formed thereon in a manner well understood in the art, the tread portion of the tube being made as thick as desired or otherwise suitably reinforced.

Then the whole is wrapped spirally with, for instance, a muslin tape 21, in a manner thoroughly understood by operatives in the tire industry, and the whole submitted to vulcanization.

After the tube has been suitably vulcanized, it is slit along its inner periphery adjacent to the segment 3, the said slit, which is denoted by 22, being of substantially the same length as the spanner 18, and preferably zigzag in form, as distinguished from a straight or plain slit.

Through this slit, the spanner 18 and segment 3 are withdrawn inwardly so as to separate them from the remaining parts of the core. The segment 2 is then twisted out of the plane of the segment 1, until the head 12 on the stud 11 coincides with the aperture 13 in the end piece 5. This segment may then be withdrawn endwise through the slit 22; after which the tube 20 may be slid circumferentially off of the segment 1, as clearly shown in Fig. 6.

If desired, it is not necessary to completely remove the segment 2, but it may be only partially twisted on its axis, as indicated in Fig. 7, thus causing that portion of the core constituted by the segments 1 and 2, to assume somewhat the form of a spiral. While in this position, the inner tube 20 may be slid circumferentially off of the segments 1 and 2, as is represented in Fig. 7. Thus, by either providing a relatively large opening between the ends of the segment 1, or by, in effect, distorting the segments 1 and 2 into the shape of a spiral, I greatly facilitate the removal of the vulcanized tube, which, on account of its relatively great thickness, particularly on the tread portion, may be somewhat stiff to handle.

I have found in practice that this apparatus is easy to manipulate, simple and efficient; and that it, in the hands of an ordinary skilled operative in this industry, enables the rapid manufacture of perfect endless inner tubes of relatively very great thickness or strength as to the tread portion.

After the tube has been removed from the core, the customary valve is inserted in the slot 22 which is covered and healed by the ordinary valve patch. Thus, in the operation of removing the endless tube from the mandrel, it is not necessary to make any incision therein which is not required in the regular manufacture of inner tubes for tires.

While I have shown and described with detail a preferred and satisfactory embodiment of my invention, it will be understood that various changes may be resorted to in the form, composition, arrangement and construction of the several parts without departing from the spirit and scope of my invention, and hence I do not intend to limit myself to the details herein shown and described except as they may be specifically included in the claims.

What I claim is:

1. A sectional core for the manufacture of inner tubes, comprising a large curved segment, a small curved segment radially removable, and an intermediate sized curved segment distortable with respect to the large segment.

2. A sectional core for the manufacture of inner tubes, comprising a large curved segment, a small curved segment radially removable, and an intermediate sized curved segment distortable with respect to the large segment and removable therefrom.

3. A sectional core for the manufacture of inner tubes, comprising a large curved segment, a small curved segment radially movable, and an intermediate sized curved segment twistable upon its axis so as to distort it with respect to the large segment.

4. A sectional core for the manufacture of inner tubes, comprising a large curved segment, a small curved segment radially movable, and an intermediate sized curved segment twistable upon its axis so as to distort it with respect to the large segment, and removable therefrom.

5. A sectional core for the manufacture of inner tubes, comprising a large curved segment, a small curved segment, and an intermediate sized curved segment, said small segment being adapted to abut an end of each of the other segments, and having its ends tapered so as to permit it to be movable radially and inwardly.

6. A sectional core for the manufacture of inner tubes, comprising a large curved segment, a small curved segment, an intermediate sized curved segment, said small segment being adapted to abut an end of each of the other segments, and having its ends tapered so as to permit it to be movable radially and inwardly, and means for locking the said small segment in abutting relationship with respect to the other segments.

7. A sectional core for the manufacture of inner tubes, comprising a large curved segment, a small curved segment, an intermediate sized curved segment, said small segment being adapted to abut an end of each of the other segments, and having its ends tapered so as to permit it to be movable radially and inwardly, a surface of said small segment and the adjacent portions of the other segments being fashioned to constitute a continuous groove, and means fitted to enter said groove for locking the three segments in abutting relationship.

8. A sectional core for the manufacture of inner tubes, comprising a large curved segment, a small curved segment, an intermediate sized curved segment, said small segment being adapted to abut an end of each of the other segments, and having its ends tapered so as to permit it to be movable radially and inwardly, a surface of said small segment and the adjacent portions of the other segments being fashioned to constitute a continuous groove, and said portions of the large and intermediate sized segments being provided with holes extending at an angle from said grooves, and a spanner having a body portion fitted to enter said groove and spikes fitted to enter said holes for locking the three segments in abutting relationship.

9. A sectional core for the manufacture of inner tubes, comprising a plurality of segments adapted when in abutting engagement to form an annulus, one of said segments being provided with a stud protruding from one end thereof and having an elongated head, another segment being provided with an end wall having an elongated aperture therein fitted to receive the head of the stud when the first mentioned segment is twisted on its axis so as to project laterally away from the plane of the core as a whole, whereby the said segment bearing the stud may be removed when in said twisted position and be locked to the other segment when both are lying in the same plane.

In testimony, that I claim the foregoing as my invention, I have signed my name this 17th day of November, 1916.

HENRY DECH.